Nov. 24, 1964  C. E. HUTCHINSON  3,158,104
AQUARIUM CLEANING DEVICE
Filed Dec. 20, 1961

INVENTOR.
CLYDE E. HUTCHINSON
BY R. E. Geauque
ATTORNEY

United States Patent Office 3,158,104
Patented Nov. 24, 1964

3,158,104
AQUARIUM CLEANING DEVICE
Clyde E. Hutchinson, 3958 Alla Road,
Los Angeles 66, Calif.
Filed Dec. 20, 1961, Ser. No. 160,871
3 Claims. (Cl. 103—148)

This invention relates to an aquarium cleaning device and more particularly to a manually operable water cleansing and filtering device for water filled tanks, aquariums and the like which provides an improved portable cleansing and filtering device for removing contaminants from water and returning the same water to the aquarium in a cleansed condition. This is an improvement of my issued patents, Nos. 2,672,987 and 2,956,507, patented March 23, 1954 and October 18, 1960, respectively.

In each of the above-referred-to issued patents, an aquarium cleaning device is provided for cleansing and filtering water of a filled tank, aquarium and the like, for removing contaminants from the water and returning the same water to the aquarium in a cleansed condition. In accordance with the inventions thereof, the device comprises, generally, an intake tube, an outlet tube and a manually operable pump intermediate of the inlet and outlet tubes wherein the inlet tube includes one end communicating with the pump and an opposite end adapted to receive the water from the aquarium and the outlet tube has one end communicating with the other end of the pump and an opposite open end supportable so as to return the water into the tank, the latter opposite open end preferably having a filter means whereby the water is filtered prior to return thereof into the tank. One disadvantage of the prior devices has been in the fact that two hands were required for the operation thereof, one for operating the pump and the other for supporting the outlet end of the outlet tube above the water of the aquarium whereby the water is aerated during its return to the tank. To overcome this disadvantage, this instant invention provides means whereby the outlet end of the outlet tube is supported by a support means provided on the inlet tube, adjacent to the pump means, to eliminate the necessity for using the other hand to support the outlet tube in spaced relationship to the surface of the aquarium water thereby making it a one handed operation which is much more convenient and frees the other hand for other uses during the operation.

This invention provides a clip secured to the inlet tube, adjacent to the pump means in spaced relationship to the inlet end of the inlet tube for detachably holding the outlet end of the outlet tube in transverse relationship thereto whereby water is expelled into the filter means secured to the outlet end thereof for filtering and aerating the water prior to return of the water into the tank. The outlet end is detachably engageable by the holding means so that the outlet end may be easily and readily detached from the holding means when the operation is finished.

It is therefore an object of this invention to provide a new and improved aquarium cleaning device which is operable and supportable during its operation by a single hand of the user.

An object of this invention is to provide a new and improved aquarium cleaning device having an intake tube, an outlet tube and a manually operable pump means secured intermediate of the tubes for cleansing and filtering the water of an aquarium or the like and returning the water into the tank whereby the relatively flexible outlet tube is securable to the inlet tube in transverse relationship thereto so as to support the outlet tube in spaced relationship to the inlet end of the inlet tube and to thereby make the outlet end of the outlet tube spacable from the surface of the water to be cleansed while supporting the device by one hand, the hand which is used to operate the pump theerof.

On of the objects of this invention is to provide a new and improved aquarium cleaning device which is economical to manufacture and is capable of mass production.

A general object of this invention is to provide a new and improved aquarium cleaning device of the character described which overcomes disadvantages of prior means and methods heretofore intended to accomplish generally similar purposes.

These and other objects of this invention will be more apparent from the following detailed description, drawings, and appended claims.

Figure 6:
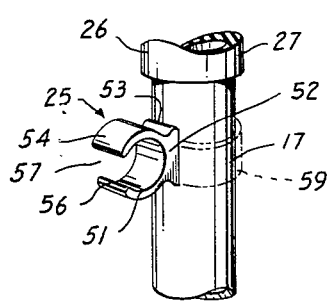
FIGURE 6 is a fragmentary perspective view, illustrating the releasable holding means of the present invention in greater detail.

Referring in detail to the drawings, there is shown by way of illustration, but not of limitation, an improved aquarium cleaning device designed and constructed in accordance with this invention and generally designated by the numeral 10. As illustrated, the device 10 is adapted for use in connection with an aquarium, generally indicated by the reference numeral 11, having, as is normally associated with an aquarium, sand 12, rocks 13, and other ornamental objects in order that the aquarium may be attractive and may simulate the normal habitat of ornamental fish or other water creatures 14 provided in the water 15 held in the tank or aquarium 11.

Figure 1:
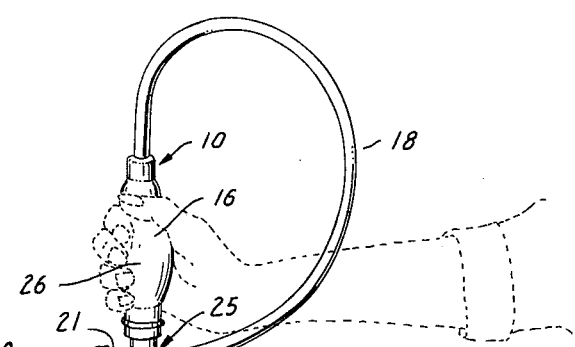
FIGURE 1 is a perspective view, in elevation, showing the aquarium cleaning device of the present invention as applied for use with an aquarium.
Figure 1:
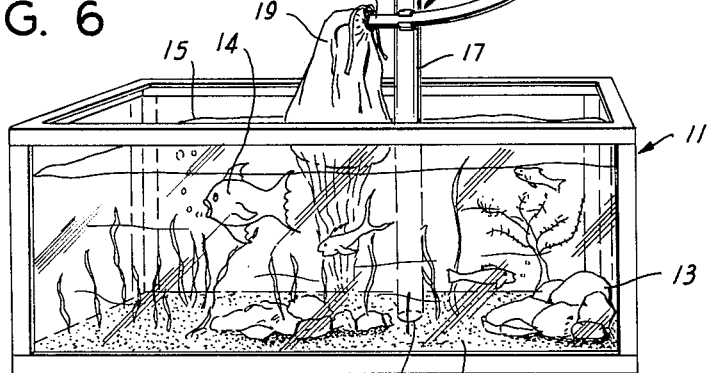

As illustrated, the cleansing and filtering device 10 includes, generally, a pumping means 16, the lower end of which is secured to an elongated, relatively rigid suction or inlet tube 17 and the upper end of which is secured to a relatively flexible outlet tube 18, this flexible tube having a porous filter bag 19 removably secured to the outlet end thereof. As best seen in FIGURE 1, the device 10 is adapted to be supported manually with one hand about a pumping member 16 with the free end 21 preferably supported in a spaced position relative to the upper surface of the water 15 whereby water from the tank is pumped through the device and expelled through the outlet end 21 after being cleansed and filtered for return into the aquarium 11. The water is additionally aerated during its fall from the free end 21 when the free end is supported above the water 15.

For this purpose, in past devices, it has been necessary to support the end 21 in spaced relationship to the upper surface of the water 15. However, in accordance with this invention, releasable holding means, generally designated by the numeral 25 is provided for supporting the free end 21 of the flexible tube 18 adjacent to the pump means 16 whereby the device 10 may be supported and operated by a single hand, with the hand in contact with a relatively flexible bulb portion 26 of the pump means 16, during operation thereof. The bulbous member 26 is provided with a tubular extension 27 in which an upper end 28 of the inlet tube 17 is adapted to be disposed. A resilient spring member 29 is positioned about the extension 27 to exert radially inwardly directed pressure to maintain the inlet tube in position therein and provide a water tight seal between the suction inlet tube and the pumping member 16.

Figure 2:
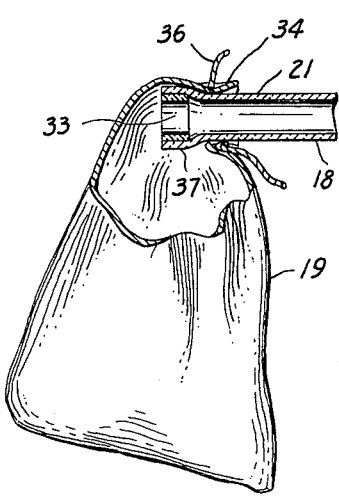
FIGURE 2 is an enlarged, cross-sectional view illustrating a filter bag and means for removably securing the bag to the device.
Figure 4:
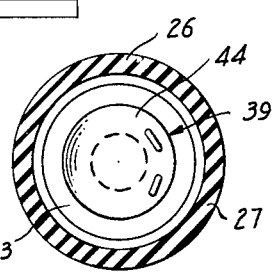
FIGURE 4 is an enlarged, horizontal, cross-sectional view as taken substantially along the line 4—4 of FIGURE 3.
Figure 5:
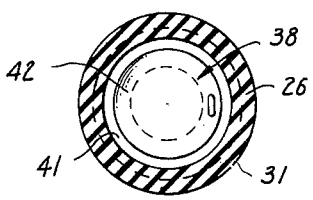
FIGURE 5 is an enlarged, horizontal, cross-sectional view as taken substantially along the line 5—5 of FIGURE 3.

The upper end of the bulbous member 26 is further provided with a tubular extension 31 in which the flexible tube 18 may be secured in position relative to the extension 31 as by a suitable adhesive 32, or the like. As shown primarily in FIGURES 1 and 2, the flexible tube 18 is adapted to extend to the filter bag 19. The free end 21 of the outlet tube 18 is adapted to receive a rigid insert 33, thereby to expand the free end and provide an enlargement thereof. Optionally, the free end 21 may be preformed with an enlargement thereon. The upper end of the filter bag is normally gathered as at 34 and secured to the flexible tube 18 as by a suitable tie of cord or the like, indicated at 36. Thus, as water flows from the flexible tube 18 from the interior of the filter bag 19, any contaminants contained therein will be retained by the filter bag 19. By removing the filter bag, by means of the tie 36, these contaminants may be easily removed from the bag. The enlargement 37 on the free end of the tube 18 prevents the filter bag 19 from being inadvertently removed from the flexible tube 18.

Figure 3:
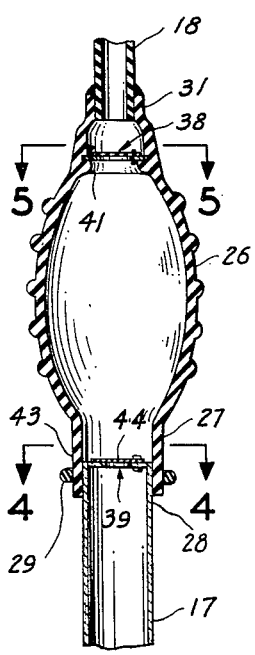
FIGURE 3 is an enlarged, vertical, cross-sectional view of the pump means employed with the present invention and illustrating the valve arrangement therefor.

In order to provide the necessary pumping action of the pumping member 16, a pair of check valves, indicated generally at 38 and 39, are provided. The check valves 38 and 39 are substantially identical, the valves being best illustrated in FIGURE 3. The check valve 38 includes an annular member 41 and a relatively thin, flexible valve member 24 adapted to be positioned on one side of the annular member 41 and to overlie an aperture extending therethrough, the periphery of the valve member 42 extending radially outwardly beyond the aperture and being spaced inwardly from the periphery of the member 41. The valve member 42 is hinged to the annular member 41 so as to open outwardly in response to squeezing of the bulbous member 26.

The check valve member 39 includes a similar annular member 43 having a flexible valve member 44 hingedly secured to the annular member 43 so as to close in response to squeezing of the bulbous member 26 and open in response to release thereof. The bulbous member 26 is comprised of a flexible, resilient material, such as rubber, neoprene, or the like so as to resiliently resume its original configuration when squeezing pressure is removed therefrom.

It may thus be more clearly understood from the foregoing description that, by systematic and repeated manual collapsing of the bulbous portion 26 of the pumping member 16, water, together with sand and contaminants, will be drawn upwardly through the suction inlet tube 17, into the interior of the bulbous portion 26 and outwardly through the flexible tube 18 into the filter bag 19 to therein be filtered and returned to the aquarium. Sand and other particles contained in the bottom of the aquarium are normally drawn into the suction tube 17 and extend part way into the suction tube to thereby be tumbled and rolled by the passage of water thereover, thereby cleansing these particles. The suction tube 17 may be moved from place to place along the bottom of the aquarium in order that various portions of the sand and contaminants contained therein will be drawn into the tube for cleansing. The tube is preferably transparent or translucent so as to facilitate observing the sand drawn into the device.

The releasably holding means 25 includes a C-shaped clip member 51 of relatively pliant, resilient material secured to the inlet suction tube 17 adjacent its upper end which is secured to the extension 27 of the bulbous portion 26. The clip member 51 comprises a base 52 secured to the tube 17 as by an adhesive or the like, indicated by the numeral 53, and a pair of outwardly extending, curved, relatively flexible fingers 54 and 56 which are in opposed relationship and define an opening 57 therebetween.

The fingers 54 and 56 are preferably curved in coextensive curved relationship to the inner surface of the base 52 so as to grippingly engage the free end 21 of the flexible tube 18 therebetween, the free end 21 of the tube 18 being laterally insertable into the interior of the clip 51 through the opening 57. In this manner, the end 21 is supportable by the releasable holding means 25 in spaced relationship to the outer end 58 of the tube 17 and above the surface of the water 15 while the device 10 is supported by operating the bulbous portion 26 with one hand. If desired, the clip 51 may be supported on the tube 17 by a band 59 secured thereto (as indicated in broken lines) and slidable relative to the tube 17 whereby the position of the clip 51 may be adjusted along the length of the tube 17, if desired.

While there is herein shown and described what is conceived to be the most practical and preferred embodiment of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. In an aquarium cleaning device comprising an inlet tube, and an outlet tube and manually operable pump means intermediate of said tubes for pumping water from an aquarium, said inlet tube having one end communicating with said pump means and an opposite end adapted to receive water from the aquarium, said outlet tube having one end communicating with an opposite end of said pump means for receiving water therefrom and an opposite free open end, a filter means supported on the said open end of the outlet tube discharging water into the aquarium through said filter means,
   releasable holding means on said inlet tube for releasably holding said outlet tube thereon adjacent said filter means to support said filter means superjacent the water in said aquarium.

2. A device as defined in claim 1, wherein said inlet tube is substantially vertical and said opposite end of said outlet tube is supported with its axis in transverse relationship to the axis of said inlet tube.

3. A device as defined in claim 1, wherein said releasable holding means includes a C-shaped clip member comprising a base secured to an external surface of said inlet tube and a pair of opposed relatively flexible fingers secured to said base and grippingly engageable with said outlet tube for supporting said outlet tube.

References Cited in the file of this patent

UNITED STATES PATENTS

| | | |
|---|---|---|
| 1,479,943 | Thompson | Jan. 8, 1924 |
| 2,956,507 | Hutchinson | Oct. 18, 1960 |
| 3,024,487 | Jones et al. | Mar. 13, 1962 |